Jan. 6, 1970

GIICHI INOUE ET AL 3,488,043

APPARATUS FOR MANUFACTURING HIGH STRENGTH, LIGHTWEIGHT
AGGREGATES FOR LIGHTWEIGHT CONCRETE AND THE LIKE

Original Filed Feb. 8, 1965

Giichi Inoue,
Soji Tsumura and
Junji Shikami
INVENTORS

BY Wenderoth, Lind
& Ponack, Attys.

United States Patent Office 3,488,043
Patented Jan. 6, 1970

3,488,043
APPARATUS FOR MANUFACTURING HIGH STRENGTH, LIGHTWEIGHT AGGREGATES FOR LIGHTWEIGHT CONCRETE AND THE LIKE
Giichi Inoue, Sakai-shi, Soji Tsumura, Kobe-shi, and Gunji Shikami, Toyonaka-shi, Japan, assignors to Osaka Cement Co., Ltd., Osaka, Japan
Original application Feb. 8, 1965, Ser. No. 431,059. Divided and this application Apr. 4, 1968, Ser. No. 737,277
Claims priority, application Japan, Feb. 11, 1964, 39/6,973, 39/6,974; Mar. 19, 1964, 39/15,142; July 6, 1964, 39/38,522; Sept. 10, 1964, 39/51,660; Oct. 13, 1964, 39/58,276
Int. Cl. F27d 3/00, 7/00, 23/00
U.S. Cl. 263—21      6 Claims

ABSTRACT OF THE DISCLOSURE

An apparatus for the manufacture of high strength, lightweight aggregates from crushed grains or pellets of bloating rock. A rotary kiln means has a sintering zone and a bloating zone therein, and a screen means associated with the kiln means. The material being treated in the kiln flows across screen means so that the powdery portion of the material is removed therefrom.

---

Figure 1:
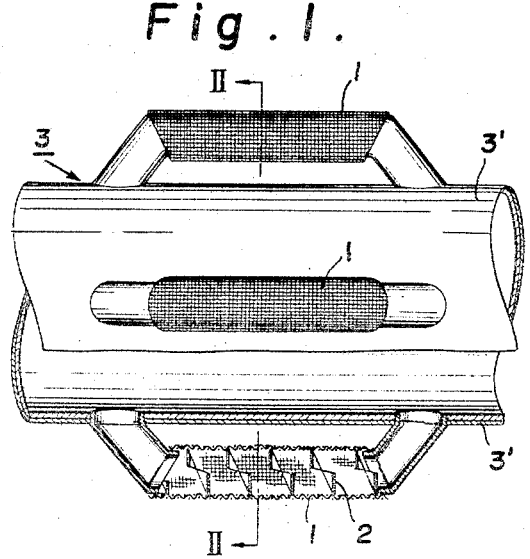

This application is a division of our copending application Ser. No. 431,059, filed Feb. 8, 1965.

This invention relates to an apparatus of manufacturing high strength, lightweight aggregates for lightweight concretes and the like.

Generally, the properties of aggregates required for lightweight aggregates concrete may somewhat vary with uses but may be summarized as follows;

(1) Light in weight and rigid,
(2) Less water absorption,
(3) Substantially spherical in shape and less open pores,
(4) Preferable distribution in particle size, and
(5) Free of harmful ingredients.

The property of aggregates specified in item (3) has been considered most difficult to secure. In burning lightweight aggregates according to the conventional methods, the material grains melt and tend to cohere with one another to form large mass. Hence, it is generally required to sift the burnt product and crush the large mass produced in large quantities into fine particles for grading. By this crushing process, the coarse lightweight aggregates having smooth surface in a molten or sintered state are altered into those having open pores on the surface and the resutling product becomes less spherical and much absorbing aggregates. It will be readily understood that it is important for providing good artificial lightweight aggregates ot prevent the material from sticking together at the time of burning. From the industrial point of view cohesion of the material is not advantageous, that is, it brings about a formation of large mass in a burning kiln as a result of which a smooth operation of the kiln is hindered. Therefore, if it is possible to carry out the burning without such cohesion, the properties of lightweight aggregates will be improved greatly and the operation of the kiln will be facilitated considerably to promote the commercial production.

When bloating rocks, such as shale, sandstone, tuff, etc., in the form of crushed grains or pellets from the powder thereof are heated in a burning kiln at certain temperaure, crushed grains or pellets tend to swell with increasing temperatures on account of gases generated therein. If the material being burnt is sufficiently viscous at the temperature of gas generation, this gas tends to retain as fine gas bubbles in the molten mass ot the material which contributes to the formation of lightweight aggregates. As seen from the foregoing explanation of the bloating mechanism, the generation of gas and the presence of a molten mass being sufficiently viscous to retain the gas are required for the bloating process. In the absence of this viscous molten mass, bloating is not accomplished. In other words, the burning of lightweight aggregates is accompanied with the formation of viscous molten mass and with the cohesion of the individual grains of the material or the cohesion between the material and the lining of a burning kiln. Therefore, it has been very difficult in the conventional methods to achieve economically a continuous production of lightweight aggregates having good grain properties.

The present invention has it in object to provide apparatus which are free of the troubles accruing from the cohesion and which facilitate industrial production of lightweight aggegates. According to this invention, the powder resutling from thermal shock and mechanical friciton of the material before it reaches the burning zone in a kiln is first removed from heated bloating rock material in the form of crushed grains or pellets; then it is subjected to bloating in the presence of another powder which has high refractoriness.

When crushed grains of a bloating rock material or pellets formed from the powder thereof are heated in a rotary kiln, a relatively large amount of non-preferable powder is accessorily produced by thermal shock and frictional effects encountered in the drying and calcining zone in the kiln. This is illustrated in Table 1, from which it is obvious that a relatively large amount of powder of bloating rock materials are accessorily produced while running through the drying and sintering zone in the kiln.

TABLE 1.—FORMATION OF POWDER FROM PELLETS IN KILN

| Material | Kiln inlet | At the end of drying zone | At the end of calcining zone | At end of bloating zone |
|---|---|---|---|---|
| Amount of powder smaller than 0.6 mm. diameter, percent | 1.2 | 8.5 | 10.2 | 11.0 |

The bloating rock powder thus accessorily produced tends to spoil the refractoriness of a refractory powder supplied as cohesion inhibitor at a beginning of the bloating stage. As seen from Table 2, the more the refractory powder is contaminated by the bloating rock powder, the lower industrially allowable burning temperature becomes. Conversely, less contaminated, higher temperature is available for burning.

TABLE 2.—THE REFRACTORINESS OF COHESION INHIBITOR CONTAMINATED BY BLOATING ROCK POWDER

| Number: | Bloating rock powder percent in contaminated refractory powder | Industrially allowable burning temperature (° C.) | Apparent specific gravity of obtained lightweight aggregate |
|---|---|---|---|
| 1 | 100 | 1,150 | 2.15 |
| 2 | 66 | 1,230 | 2.20 |
| 3 | 57 | 1,250 | 1.85 |
| 4 | 50 | 1,270 | 1.54 |
| 5 | 45 | 1,290 | 1.36 |
| 6 | 25 | 1,310 | 1.18 |
| 7 | 21 | 1,330 | 0.98 |

As seen from Table 2, when the bloating rock powder in the contaminated refractory powder becomes less than 45 percent, the cohesion is prevented at a burning temperature of higher than 1290° C. to permit the production of lightweight aggregates. It will be readily understood from the foregoing tables that in preparing lightweight aggregates in the presence of a refractory powder supplied to crushed grains or pellets of a bloating rock without removing the bloating rock powder which has been accessorily produced prior to the bloating zone, a large amount of cohesion inhibitor is required. This is not advantageous. In the case of the bloating rock illustrated in Table 3, a burning temperature of at least 1300° C. is required for obtaining a final product having an apparent specific gravity of 1.2 to 1.3 and less water absorption. In such a case a burning temperature calls for the refractory powder which is contaminated by less than 30 percent of the bloating rock powder or at least 30 kilograms of cohesion inhibitor for 100 kilograms of pellets. Whereas, if the cohesion inhibitor is introduced into bloating zone after the bloating rock powder has been removed before subjected to bloating, very small amount of cohesion inhibitor will be needed to maintain the necessary bloating temperature without cohesion.

TABLE 3.—COMPOSITIONS OF BLOATING ROCK MATERIAL AND COHESION INHIBITOR

| | Ignition loss | $SiO_2$ | $Al_2O_3$ | $Fe_2O_3$ | CaO | MgO | $SO_3$ | $Na_2O$ | $K_2O$ | Total |
|---|---|---|---|---|---|---|---|---|---|---|
| Bloating rock | 3.2 | 72.9 | 14.2 | 3.0 | 0.5 | 1.2 | Trace | 2.14 | 2.27 | 99.41 |
| Cohesion inhibitor | 6.2 | 84.9 | 5.3 | 0.9 | 0.4 | 0.2 | 3.0 | | | 100.0 |

Even in the conventional methods, it is possible to prevent the aggregates from sticking together if 30 percent or less of bloating rock powder is present in the contaminated cohesion inhibitor as shown in Table 2. In such a case, however, the cohesion inhibitor containing such a large amount of bloating rock powder tends to stick as a baked film to the surface of aggregates. In other words, while the cohesion preventive effect may be maintained at a burning temperature of about 1300° C., the resulting product will become a poor aggregate having a film baked on the surface thereof.

The operation of the apparatus of the present invention is characterized by the separation and removal of the bloating rock powder immediately before the material is introduced into the bloating zone. This is a prerequisite to reducing the amount of cohesion inhibitor and thereby improving the quality of lightweight aggregates desired.

Thus, in accordance with the present invention, a bloating rock material consisting of, for example, shale, sandstone, etc. in the form of crushed grains or pellets prepared from the powder thereof is subjected to burning for providing lightweight aggregates, wherein a refractory powder is added as cohesion inhibitor to the bloating rock material having its powder, accessorily produced in the drying and calcining zone, already been deprived of. By eliminating the contamination of the cohesion inhibitor in the bloating zone and permitting the presence of the cohesion inhibitor together with crushed grains or pellets of bloating rock, it facilitate to produce the desired lightweight aggregates.

For carrying the present invention into practice, there may be considered many combinations of processes as may be classified by the method of separation and removal of bloating rock powder from crushed grains or pellets.

For example:

(1) By screening, and
(2) By separating action by gas flow.

They may be also classified by the method of supplying cohesion inhibitor:

(1) Feeding the inhibitor just before the bloating rock material is subjected to bloating.
(2) Blowing it into the kiln together with fuel from the burner.

Now, apparatus having these processes in combination will be discussed with reference to the following examples.

Example I

Figure 2:
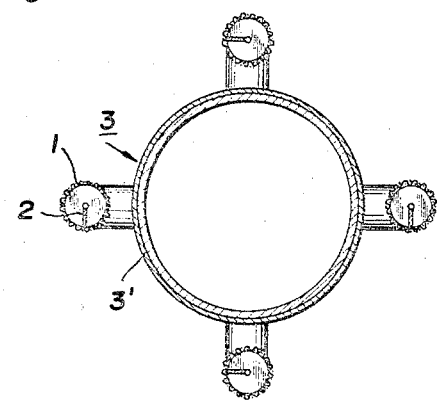
Figure 3:
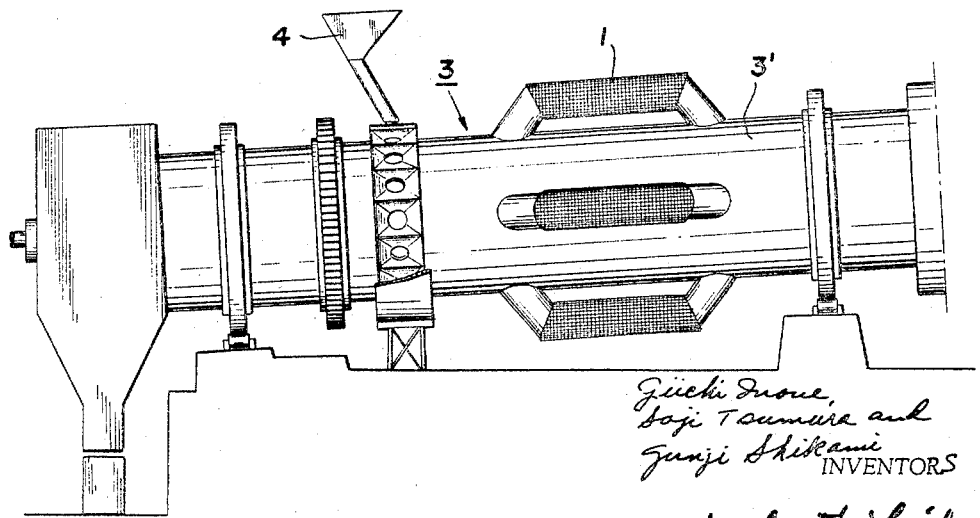

FIGS. 1, 2 and 3 show apparatus using a screen for separating the powder of bloating rock material. Cylindrical screens 1 with a wire net of 4.5 mm. mesh are mounted on the kiln wall 3' of a kiln 3 in either inclined or not inclined position with respect to the center axis of the kiln as shown in FIGS. 1 and 2. FIG. 2 is a sectional view of the kiln taken on lines II—II of FIG. 1. Within the cylinder, spiral blades 2 are provided for the purpose of improving the flow of the material to be bloated. By allowing the material having undergone the drying and sintering to pass the screens, the powder and fine particles smaller than 4.5 mm. in diameter of the bloating rock material can be substantially removed. As seen in FIG. 3, a refractory powder feeding pipe 4 is mounted next to the screens. With this screening device, it was possible to remove the powder in an amount of 10 to 15 percent of the pellets. The residual bloating rock powder was present only on the order of 0.0 to 0.2 percent. Thus, with the supply of the cohesion inhibitor in an amount of 5 to 10 percent of the pellets, it was possible to successively burn good, high strength and lightweight aggregates.

Example II

Figure 4:
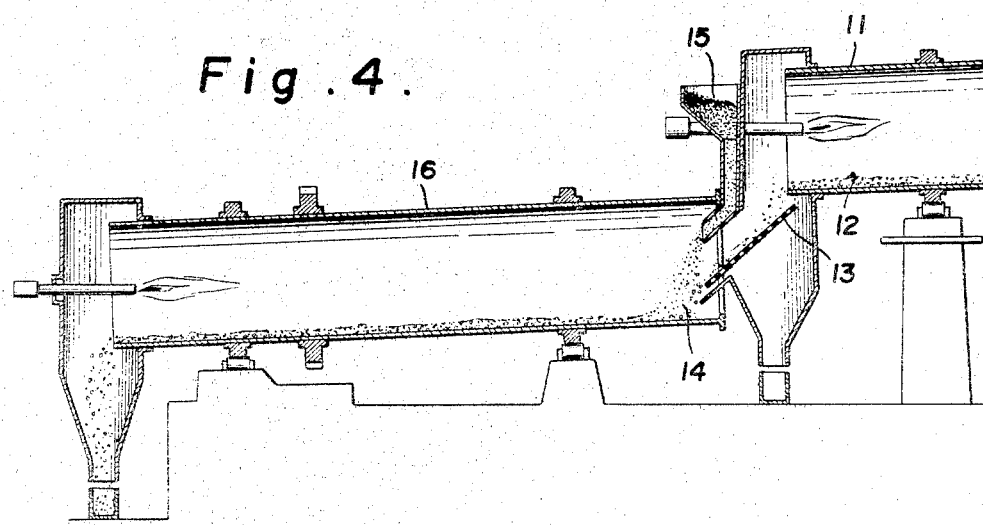

The apparatus shown in FIG. 4 is the same principle as that shown in FIG. 1 except that the screening mechanism is simplified and that the kiln is divided into two units in view of the screen structure. This apparatus consists mainly of a kiln 11 for appropriately sintering a bloating rock material in the form of crushed grains or pellets 12 made from the powder thereof, a screen 13 for removing the bloating rock powder accessorily produced in the sintering kiln, and a bloating kiln 16 for bloating a mixture of crushed grains or pellets 14 of the bloating rock material having its powder been deprived of and a refractory powder 15.

The function of the kiln 11 is to sinter the crushed grains or pellets of the bloating rock material and provide a strength thereto to such an extent that they may not break or wear before they reach the bloating zone. Generally crushed grains or pellets are not resistant to abrasion particularly at a temperature below 1000° C., so that the role of the sintering kiln is so much more important. The material coming out of the sintering kiln contains about 10 to 15 percent of the bloating rock powder. Upon removal of such powder, there was no spoiling in the effect of the cohesion inhibitor supplied from the inlet of the bloating kiln since the bloating rock powder produced thereafter in the bloating kiln was very small in amount. Therefore, only a small amount of cohesion inhibitor was sufficient. For example, by supplying the refractory powder in an amount of about 5 percent, lightweight aggregates were industrially successfully manufactured without accompanying cohesion.

Example III

Figure 5:
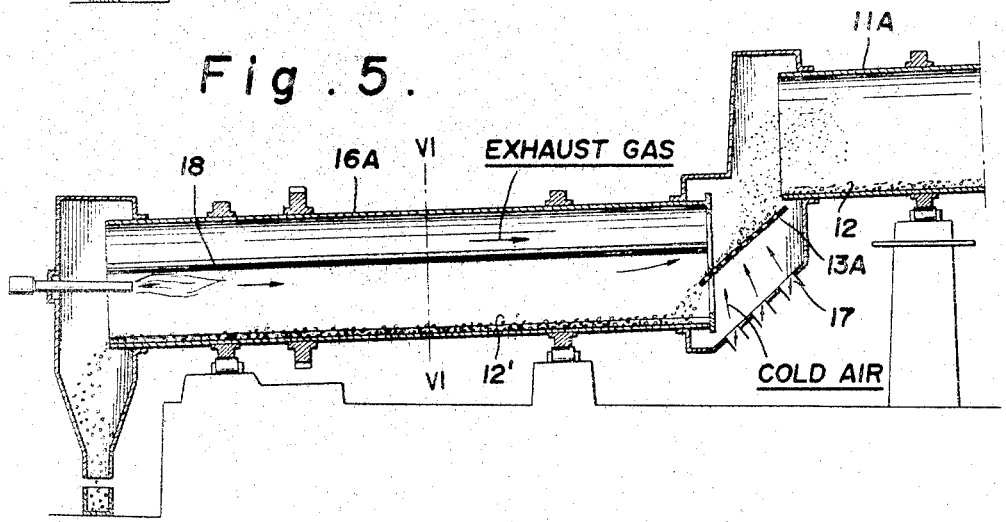
Figure 6:
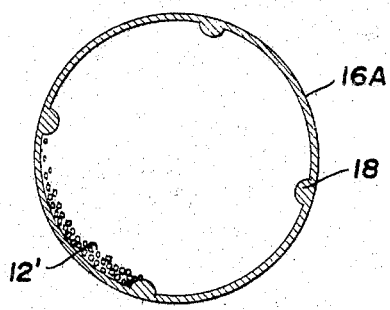

The apparatus shown in FIG. 5 is an improvement of the apparatus of Example II, utilizing a powder-blasting-method along with the said powder separation mechanism. Crushed grains or pellets at outlet of sintering kiln contain the powder which is accessorily produced by thermal shock and the abrasion due to rotation of the sintering kiln and movement of the material in it. When crushed grains or pellets 12 roll down over a screen 13A, the bloating rock powder therein is separated from crushed grains or pellets and is blown back into the kiln 11A by the joint action of the exhaust gas from a bloating kiln 16A and of the air introduced from cold air inlets 17 under the screen. Thus, only crushed grains or pellets 12' substantially free of the bloating rock powder accessorily produced are fed to the bloating kiln. Moreover, when crushed grains or pellets 12' are raised by a lift 18 which is mounted on the inner pheriphery of the bloating kiln 16A as shown in FIG. 6 which is a sectional view of the kiln taken on line VI—VI of FIG. 5 and are sprinkled into the combustion gas, the bloating rock powder which has not been perfectly removed by the foregoing apparatus is blasted out of the bloating kiln 16A into the sintering kiln 11A. The lift 18 has, in addition to the function of separating the powder, another function of preventing the sliding motion of the material and improving the heat transfer in the bloating kiln. It also has an effect on preventing crushed grains or pellets from sticking together to form large mass in the bloating zone.

Now it is described the result carried out by this apparatus, where the pellets were used as the material. As already stated, the material in the form of pellets is not physically rigid so that the bloating rock powder is accessorily produced by the friction of mutual particles and by the friction between particles and lining in the sintering kiln. The powder is then separated from the pellets by the screening effect of the screen and the separating action of the cold air and the exhaust gas from the bloating kiln so that the pellets free of powder are fed to the bloating kiln, as this may be apparent from Table 4. As seen, at the outlet of the sintering kiln, the material contains about 8 percent of the bloating rock powder. By this separating apparatus, the amount of powder is reduced at most to 0.2 percent or substantially nil. When the material is introduced into the bloating kiln, it is already resistant to abrasion so that it seldom produces the powder of the bloating rock. This is also apparent from Table 4. In Table 5 are shown the properties of the products obtained. The bloating rock and the cohesion inhibitor used in this example are of the compositions shown in Table 3. The cohesion inhibitor was fed prior to the bloating zone in an amount of 5 parts against 100 parts of the pellets. It was intended to continuously manufacture high strength, lightweight, and less absorptive aggregates by melting the surface of the material without involving the cohesion between individual pellets and between the pellets and the lining of the kiln.

TABLE 4.—AMOUNT OF POWDER ACCESSORILY PRODUCED IN THE KILN

| | Amount of powder passing 0.6 mm. sieve | |
| --- | --- | --- |
| | Outlet of sintering kiln | Prior to bloating zone |
| No. 1 | 9.5 | 0.2 |
| No. 2 | 7.0 | 0.1 |
| No. 3 | 5.5 | 0.0 |
| No. 4 | 8.5 | 0.0 |

TABLE 5.—PROPERTIES OF LIGHTWEIGHT AGGREGATES

| | Dry compact unit weight, kg./l. | Apparent specific gravity | Absorption, percent |
| --- | --- | --- | --- |
| No. 1 | 0.84 | 1.35 | 1.5 |
| No. 2 | 0.78 | 1.25 | 2.5 |
| No. 3 | 0.84 | 1.32 | 2.1 |
| No. 4 | 0.65 | 1.10 | 2.5 |

Example IV

Figure 7:
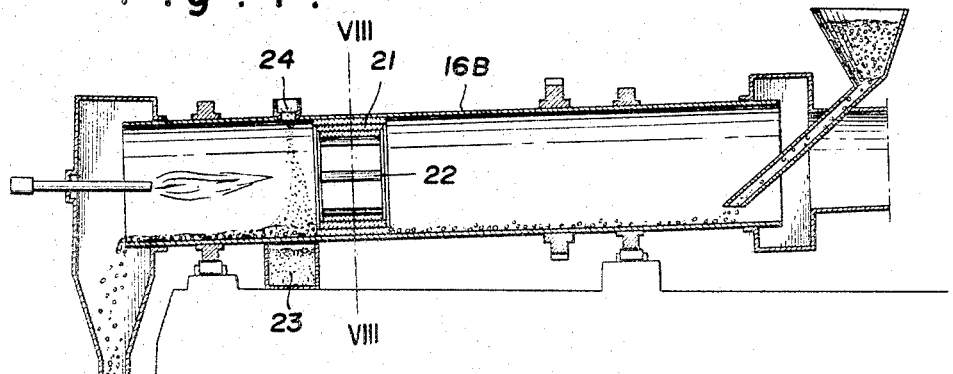
Figure 8:
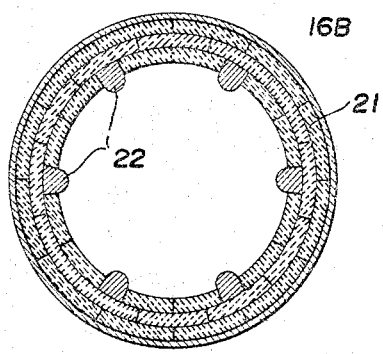

This example is different from the foregoing Examples I, II and III in that the separation of the accessorily produced powder of bloating rock material is accomplished not with use of a screen but exclusively by the action of combustion gas flow. This is schematically illustrated in FIGS. 7 and 8. FIG. 7 is a vertical cross-sectional view of the apparatus and FIG. 8 is a cross-sectional view taken along the line VIII—VIII of FIG. 7. The mechanism of the apparatus will be described with reference to the drawings. Immediately before the bloating zone is provided a dam 21 where the kiln 16B is narrowed cross-sectionally to let the combustion gas flow at a greater velocity. On the dam along the inner periphery thereof is provided lifts 22 parallel to the axial direction of kiln. The material is elevated as the kiln rotates and is sprinkled into the high speed combustion gas. The powder of bloating rock is then blasted back toward the inlet of the kiln. Thus, the bloating rock powder circulates between the inlet of the kiln and the dam 21 without flowing down the kiln over the dam. The powder is transformed into pellets partly by itself and partly together with the material during the circulation, while the rest of the powder is blasted out of the kiln.

Therefore, only the pellets are conveyed over the dam to the bloating zone. In the bloating zone, the refractory powder 23 is fed by means of scopper 24 so that only the material free of powder and the refractory powder are introduced into the bloating zone to permit a stable bloating without undesirable cohesion.

The bloating rock material and the cohesion inhibitor used were the same as those used in Example III. The bloating rock material was pulverized and prepared into pellets which were supplied to the kiln. The result is shown in Table 6. According to the conventional method (in which the powder accessorily produced from the material is present in the bloating zone), there is about 10 to 15 percent of the pellets in the form of powder in the bloating zone so that the cohesion effect is provided only when the refractory cohesion inhibitor is supplied in an amount of, say, 400 kilograms or more per ton of the pellets. The product thus obtained is not satisfactorily light in weight. The use of this inhibitor in an amount of 600 kilograms per ton of the pellets gave the aggregates in light weight. However, this is accompanied with a defect such that a layer of contaminated refractory powder was baked firmly onto the surface of the aggregate produced. Thus, according to the conventional method, it was not possible to provide lightweight aggregate other than those having a baked layer of contaminated refractory powder formed on the surface thereof even if a considerably large amount of cohesion inhibitor was used. Whereas, according to the method of the present invention, with the refractory powder in such a small amount of 100 kilograms per ton on the bloating rock material, it was possible to produce lightweight and less water-absorptive aggregates without difficulties even at an elevated burning temperature of 1310° to 1350° C., at that the surface of the material was molten well to become less water-absorptive. Moreover, as a result of reducing the contamination of the refractory powder by the bloating rock powder and reducing the amount of refractory powder, the refractory powder layer on the aggregates exists only in such a thickness negligible for all practical purposes.

hesion inhibitor to those shown in Table 3 were used. The bloating rock material was fed as pellets. The refractory powder or cohesion inhibitor was charged from the burner in varying amounts of 0, 12, 31, 40 and 50 kilograms per ton of the material as shown in Table 7. As seen, greater amounts of the cohesion inhibitor provided better effects. However, in the case of a cohesion inhibitor used in this example, a remarkable improvement about the effect preventing cohesion was observed by spouting

TABLE 6.—TEST RESULTS

|  | Starting material | Cohesion inhibitor, kg./ton of starting material | Bloating rock powder percent in contaminated cohesion inhibitor | Industrially permissible burning temperature °C. | Apparent specific gravity |
|---|---|---|---|---|---|
| Conventional method | Pellets | 0 | 100 | 1,150 | 2.15 |
|  | do | 100 | 66 | 1,230 | 2.20 |
|  | Strengthened+ pellets | 100 | 57 | 1,250 | 1.85 |
|  | Pellets | 400 | 50 | 1,270 | 1.54 |
|  | do | 600 | 45 | 1,290 | 1.36 |
| Method of this invention | do | 100 | 25 | 1,310 | 1.18 |
|  | do | 150 | 21 | 1,330 | 0.98 |

+Strengthened: With addition of 3 percent of portland cement.

Example V

Figure 9:
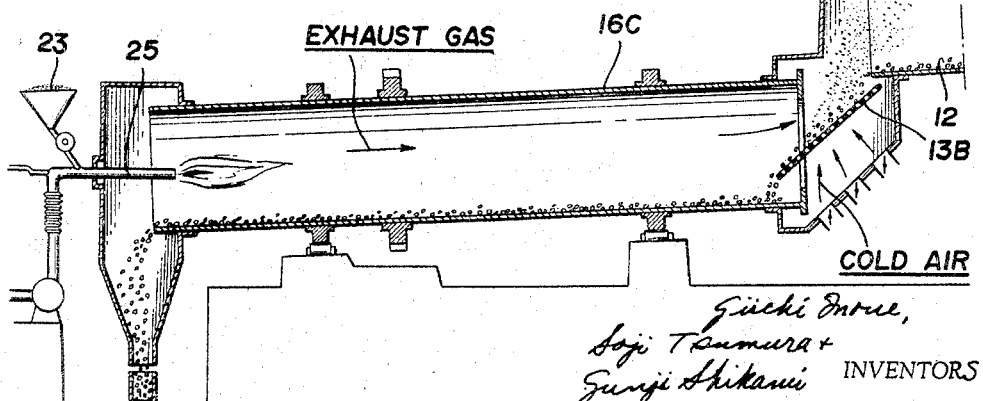

As shown in FIG. 9, the apparatus of this example is characterized in that the refractory powder is charged in a jet from the burner of the kiln toward the bloating zone. Such a system is advantageous, because the solid powder is spouted together with the flame so that fuels of poor luminous flame radiation, such as, heavy oil, natural gas, liquefied petroleum gas, and the like may be considerable increased in their emission power. In FIG. 9 are shown a sintering kiln 11B, a material 12, a screen 13B, and a bloating kiln 16C, the respective functions thereof being entirely the same as those illustrated in Examples II, III and IV. A burner 25 is designed to spout the refractory powder 23 together with the flame. The cohesion inhibitor charged from the burner, while serving for increasing the emission power of luminous flame, deposits in the kiln from the bloating zone to the inlet and exhibits an effect of preventing the material being burnt from sticking together. Thus, the material bloats sufficiently but never sticks together.

This process is applicable especially where coal, heavy oil, natural gas, liquefied petroleum gas, or the like is used as fuel.

in an amount of 30 kilograms or more per ton of the material. At a smaller amount of spouting, for example, 12 kilograms per ton of the material, the bloating temperature was limited to 1230° C. In such a case, when the bloating temperature was elevated, cohesion of the aggregates took place to make it difficult to manufacture lightweight aggregates as desired. Referring to Table 7, it is obvious that the aggregates produced by the present method have less water absorption than that of conventional lightweight aggregates. This is due to the merits of the present invention in which the bloating is accomplished at higher temperature without causing cohesion of the aggregates. The effect preventing cohesion of the refractory powder varies greatly depending on the amount of the bloating rock powder being present in the bloating zone together with the bloating rock material; namely, the smaller the amounts of bloating rock powder the greater such effect is. In the case of this example, the bloating rock powder was almost completely removed by the screening apparatus placed before the bloating kiln so that excellent preventing effect of cohesion was obtained.

The operation of the apparatus will be described with reference to the use of heavy oil as a fuel. The result is shown in Table 7. Similar bloating rock material and co- Tables 8 and 9 are given to account for the results of testing of the concrete made with the lightweight aggregates obtained in accordance with the present invention.

TABLE 7.—TEST RESULTS (OF EXAMPLE V)

| Calories of heavy oil, Kcal./kg. | Amount of heavy oil, l./ton of material | Amount of cohesion inhibitor spouted, kg./ton of material | Bloating temp., °C. | Lightweight aggregates | |
|---|---|---|---|---|---|
|  |  |  |  | Apparent specific gravity | Water absorption, percent |
| 10,320 | 112 | 0 | 1,200 | 2.03 | 2.45 |
| 10,320 | 117 | 12 | 1,230 | 1.91 | 1.46 |
| 10,320 | 126 | 31 | 1,270 | 1.37 | 1.51 |
| 10,320 | 130 | 40 | 1,290 | 1.26 | 1.57 |
| 10,320 | 130 | 50 | 1,300 | 1.20 | 1.55 |

TABLE 8.—PROPERTIES OF AGGREGATES

| Percent passing | | | | | Fineness modulus | Dry compact unit weight (kg./m.³) | Apparent specific gravity | Water absorption |
|---|---|---|---|---|---|---|---|---|
| 25 mm. | 20 mm. | 15 mm. | 10 mm. | 5 mm. | | | | |
| 100 | 100 | 84 | 40 | 6 | 6.55 | 760 | 1.25 | 1.29 |

TABLE 9.—TEST RESULTS OF CONCRETE

| Slump, cm. | Flow, cm. | W/C, percent | S/A, percent | Air, percent | Weight per cubic meter (kg.) | | | | Compressive Strength (kg./cm.$^2$) | |
|---|---|---|---|---|---|---|---|---|---|---|
| | | | | | Cement | Water | Sand | Lightweight aggregate | 7 days | 28 days |
| 18.1 | 55.3 | 52.1 | 40.3 | 4.9 | 349 | 182 | 689 | 506 | 148 | 252 |
| 18.9 | 55.2 | 60.4 | 39.9 | 5.1 | 303 | 183 | 696 | 520 | 117 | 214 |
| 18.5 | 55.9 | 73.4 | 39.9 | 4.3 | 253 | 187 | 709 | 529 | 95 | 150 |

The invention is not restricted to the specific illustrated embodiment, but is subject to modifications and adaptations which will occur to those skilled in the art, and it should be understood that protection is sought for the invention, as covered by the spirit and the language of the attached claims.

What is claimed is:

1. An apparatus for the manufacture of high strength, lightweight aggregates from crushed grains or pellets of bloating rock, comprising a rotary kiln having a sintering zone and a bloating zone therein, and a plurality of cylindrical screens spaced around the outside of the kiln, each extending laterally out of the kiln from the sintering zone, then along the kiln and spaced radially outwardly of the outer wall of the kiln and across the boundary between the sintering zone and the bloating zone and then laterally of the kiln back into the bloating zone, the material being treated in the kiln flowing along the cylindrical screens so that the powdery portion of the material is removed therefrom.

2. An apparatus as claimed in claim 1 further comprising means for supplying a cohesion inhibitor operatively associated with said kiln and opening into said bloating zone downstream of the point at which said cylindrical screens enter said bloating zone.

3. An apparatus for the manufacture of high strength, lightweight aggregates from crushed grains or pellets of bloating rock, comprising a sintering kiln for sintering the material, a bloating kiln adjacent said sintering kiln for bloating the material, a screen positioned between the outlet end of said sintering kiln and the inlet end of the bloating kiln along which the sintered material passes for removing from the material which has been sintered the powdery portion thereof, and a means operatively associated with said bloating kiln for feeding cohesion inhibitor into said bloating kiln.

4. An apparatus as claimed in claim 3 in which said apparatus has air inlets positioned below said screen directed upwardly through said screen to a point adjacent the outlet from said sintering kiln for blasting powdery material not sifted out by the screen back into the sintering kiln, and said bloating kiln has lifts therein for lifting the material being bloated, whereby the powdery portion of the material which enters the bloating chamber is blasted back toward said screen by the combustion gas from the bloating kiln.

5. An apparatus as claimed in claim 3 in which said bloating kiln has a fuel injection nozzle for feeding fuel into the bloating kiln, and said apparatus further comprises means coupled to said fuel injection nozzle for feeding cohesion inhibitor into said fuel injection nozzle for injection into said bloating kiln with the fuel.

6. An apparatus for the manufacture of high strength, lightweight aggregates from crushed grains or pellets of bloating rock, comprising a rotary kiln having a sintering zone and a bloating zone therein, an annular dam around the interior surface of said kiln rotary kiln between said zones, and lift members on the inner peripheral surface of said dam for lifting the material coming from the sintering zone into the bloating zone, the flow of combustion gas from the bloating zone to the sintering zone being accelerated as it passes through the opening defined by the inner peripheral surface of said dam for removing the powdery material from the sintered material being lifted past the dam.

References Cited

UNITED STATES PATENTS 2,627,642  2/1953  Osborne _____ 106—40
2,639,269  5/1953  Dube _____ 263—33 X

FOREIGN PATENTS 695,029  9/1930  France.

JOHN J. CAMBY, Primary Examiner

U.S. Cl. X.R.

263—33